Aug. 6, 1968    SEIJI SANGA ETAL    3,395,567
GAS CHROMATOGRAPH

Filed Feb. 2, 1965    3 Sheets-Sheet 1

Seiji Sanga,
Takao Ohtsu and
Fujihiko Sekido,
INVENTORS

BY Wenderoth, Lind
and Ponack,
Attorneys

United States Patent Office 3,395,567
Patented Aug. 6, 1968

3,395,567
GAS CHROMATOGRAPH
Seiji Sanga, Tokyo, and Takao Ohtsu and Fujihiko Sekido, Yokohama-shi, Japan, assignors to Japan Gasoline Co., Ltd., Tokyo, Japan, a corporation of Japan
Filed Feb. 2, 1965, Ser. No. 429,856
Claims priority, application Japan, Feb. 4, 1964, 39/5582
5 Claims. (Cl. 73—23.1)

ABSTRACT OF THE DISCLOSURE

A gas chromatographic apparatus having a plurality of thermal conductivity cell portions, a portion of which is reference cell portions and the remainder of which is sampling cell portions and means to feed gas to be analyzed through these portions for comparison with a reference, temperature responsive electrical resistance elements in each cell portion, with the resistance elements being connected in a plurality of parallel circuits which include a variable resistance, the variable resistances being connected to a multiposition double pole switch, which when it is in different positions, connects the various parallel circuits in different bridge circuits.

---

This application relates to an electrical circuit of the Wheatstone bridge type for the thermal conductivity cell used in the apparatus for gas chromatography.

The principles and techniques of gas chromatography are well-known. The mixture of gas to be analyzed passes through the column, then the separated components pass from the chromatographic column into a thermal conductivity cell containing detectors which actuate a device for indicating a signal proportional to the thermal conductivity of the component.

The thermal conductvity cell employs as detectors an even number of four or more tungsten or platinum filaments or thermistors. In the case of four elements, two are used as reference elements and the other two are used as sampling elements. These four elements of the thermal conductivity cell form the four branches of a Wheatstone bridge.

The battery or stabilized direct current source supplies current ot the bridge through a variable resistor, and in the thermal conductivity cell, the elements are heated by an electric current and the thermal conductivity cell is heated by the other heaters to a suitable temperature for analysis. When each component of gas separated by the chromatographic column passes over the sampling element, the temperature of the element is changed because the rate of transfer of heat from the element to its surrounding is affected by the thermal conductivity of the gas. The change of the temperature of element causes the change of the resistance of the sample element and unbalances the Wheatstone bridge.

This Wheatstone bridge is connected to the recording or digitizing device and the unbalance of the bridge sends a voltage to connected recording or digitizing instrument.

Our invention relates to the electrical circuit of a Wheatstone bridge of the thermal conductivity cell and the connection between this Wheatstone bridge and recording or digitizing instrument for gas chromatography.

In the accompanying drawings, we have illustrated certain presently preferred embodiments of our invention, in which.

Figure 1:
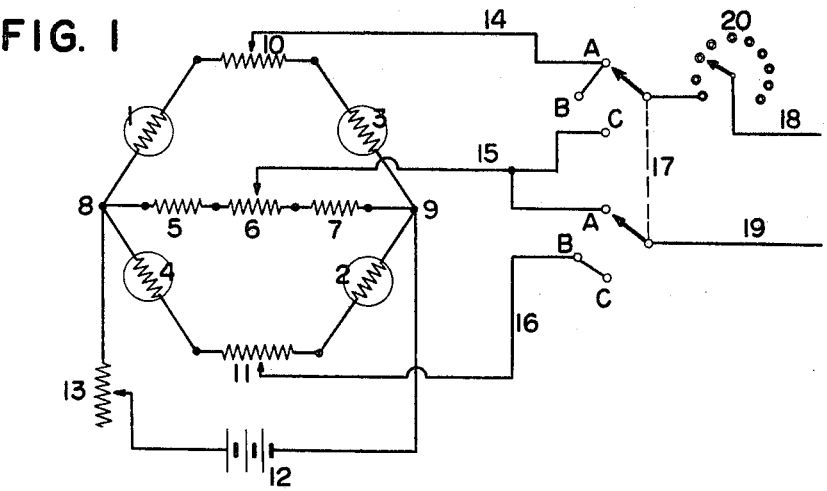
FIGURE 1 is an electrical diagram showing the electrical circuits of the thermal conductivity cell which we have invented.
Figure 3:
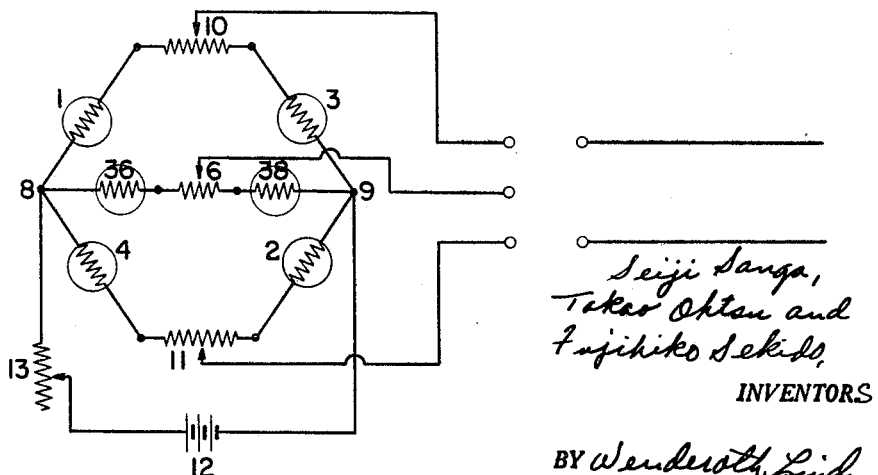
FIGURE 3 is an electrical diagram showing a modification of the electrical circuit shown in FIGURE 1.
Figure 4A:
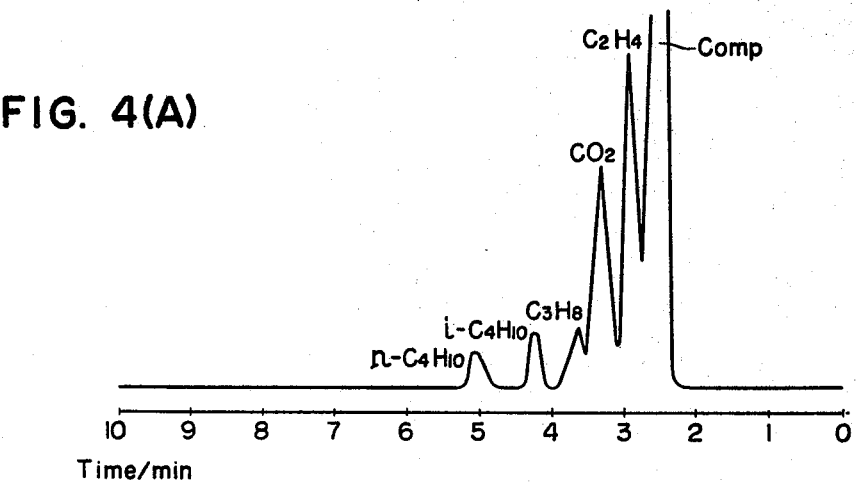
Figure 4B:
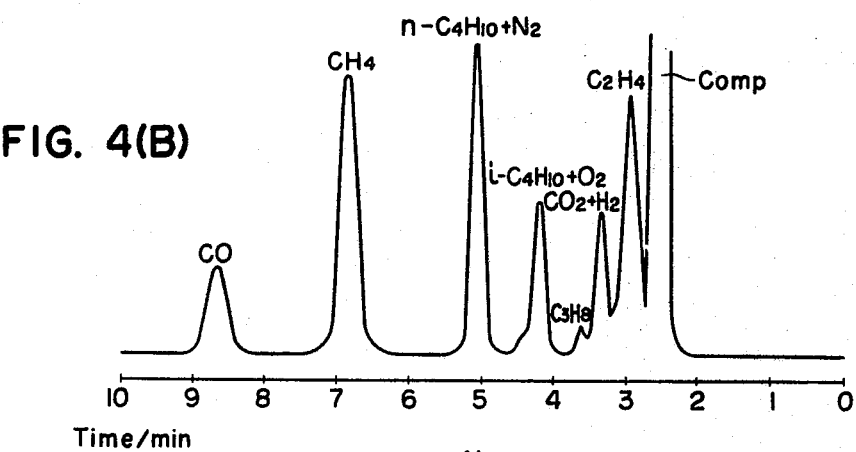
Figure 4C:
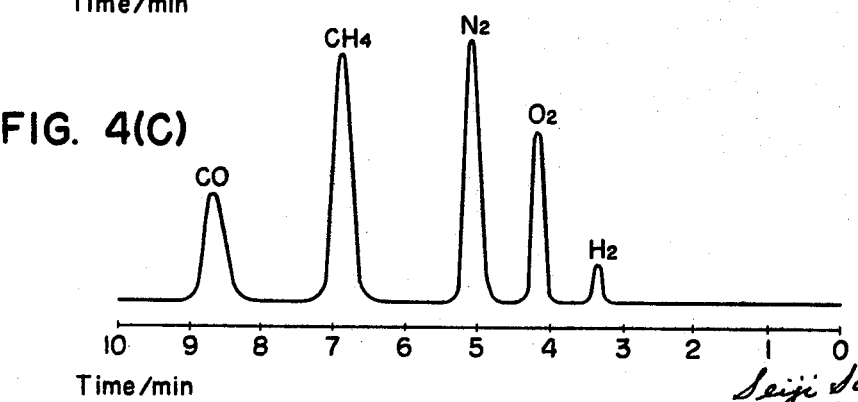
Figure 5:
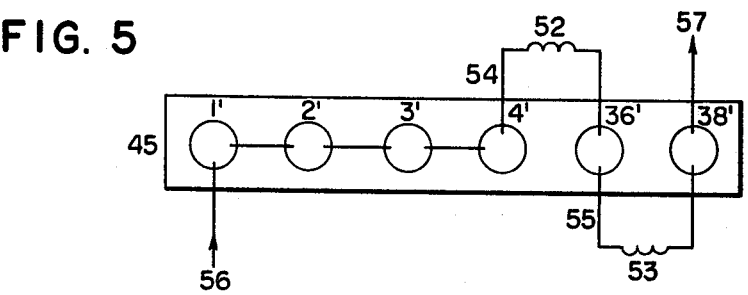
Figure 6:
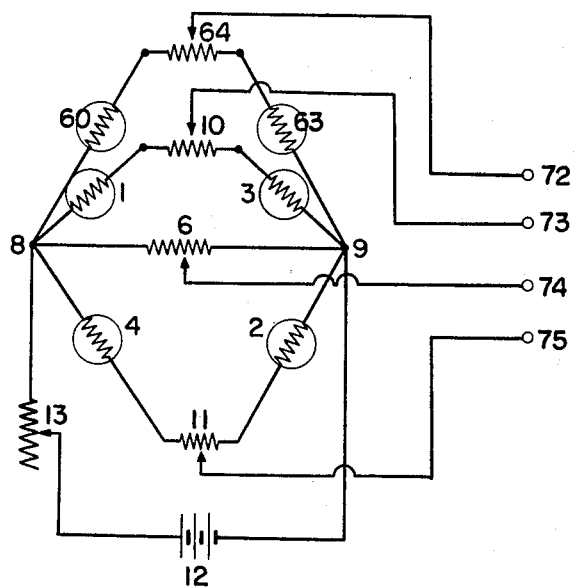
Figure 7:
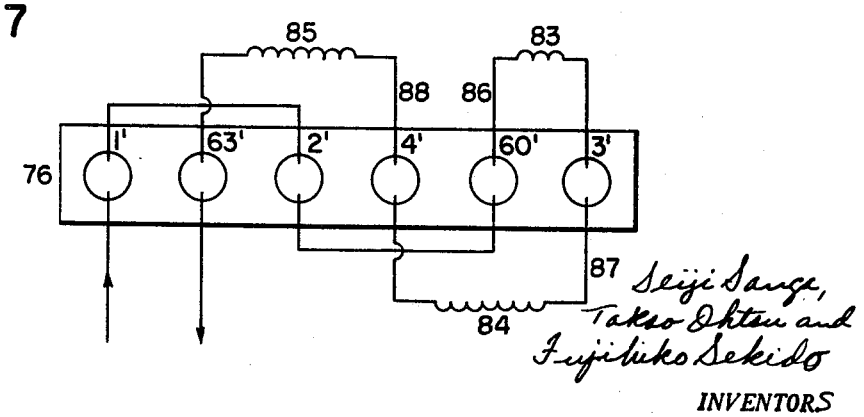

FIGURES 4a—4c are reproductions of chromatograms obtained by this invented apparatus;

FIGURE 5 is a diagram of the arrangement of elements and columns for the electrical circuit shown in in FIGURE 3;

FIGURE 6 is an electrical diagram showing a second modification of the electrical circuit shwn in FIGURE 1;

FIGURE 7 is a diagram of the arrangement of elements and columns for the electrical circuit shown in FIGURE 6.

FIGURE 1 shows the electrical diagram of the thermal couductivity cell and the details of the thermal conductivity cell will be described hereinafter.

The four elements (tungsten or platinum filament or thermistor) 1, 2, 3, and 4 of the thermal conductivity cell form four branches of a Wheatstone bridge and elements 1 and 2 are reference elements and elements 3 and 4 are sampling elements.

The battery or stabilized direct current source 12 supplies current through variable resistor 13 to the terminals 8 and 9 of the Wheatstone bridge. Between the elements 1 and 3, and between elements 2 and 4, there are two variable resistors 10 and 11 which may be controlled manually and used as a balance of bridge. Between terminals 8 and 9 there are two resistors 5 and 7 and one variable resistor 6.

The resistance value of four elements must be the same value, and variable resistors 10 and 11 are the same. The total value of three resistors 5, 6 and 7 is equivalent to total value of the two elements 1 and 3 and one variable resistor 10 or elements 2 and 4 and variable resistor 11. Leads 14, 15 and 16 from each variable resistor 10, 11 and 6 are connected to a two pole-three position-rotary selector switch 17. Leads 18 and 19 are connected to a recording or digitizing instrument through an attenuator 20. The rotary selector switch was three position A, B, and C.

On the A and C positions of rotary selector switch 17, the change of resistance of only one of the sampling elements 3 and 4 sends a voltage to a recording system, respectively. But on the B position, the recording or digitizing instrument receives the signal from both sampling elements 3 and 4.

Figure 2:
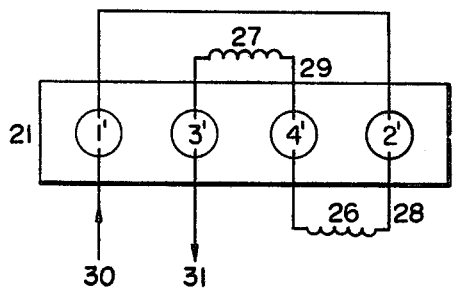
FIGURE 2 is a diagram showing the arrangement of elements and columns.

FIGURE 2 is a diagram illustrating the arrangement of elements and columns. The thermal conductivity cell 21 has four elements 1', 3', 4' and 2' (tungsten or platinum filament or thermistor) and carrier gas inlet 30 and outlet 31. There are two columns 26 and 27 and two sample inlet systems 28 and 29.

Two elements 1' and 2' correspond to the reference elements 1 and 2 and the other two elements 3' and 4' correpsond to the sampling elements 3 and 4 of FIGURE 1 respectively.

The operation of the apparatus in FIGURE 1 is described using steam reforming gas as an example of the gas to be analyzed. The components of this gas are as follows: hydrogen, methane, carbon dioxide, carbon monoxide, oxygen, nitrogen and light hydrocarbons.

The chromatographic columns 26 and 27 of FIGURE 2 are packed with c–22 fire-brick coated with hexamethylphosphoamide and the molecular sieve 5A, respectively.

The sample gas is injected through the inlet system 28. The mixture of hydrogen, oxygen, nitrogen, carbon monoxide and methane is passed through the first column 26 without separation and into the second column, in which the mixture is separated into separate components, while the carbon dioxide and light hydrocarbons are separated in the first column.

In the B position of rotary selector switch 17 of FIGURE 1, signals of both elements 3' and 4' are recorded on the recording instrument. So all components of the sample gas are recorded on one chromatogram, but it is very difficult to find out whether or not some of the components are separated clearly or overlap each other.

If it is required to check the clear separation of components, this apparatus is operated so as to record separately the signals from columns 26 and 27 on two chromatograms which indicate each component of the sample gas, by using the positions A and C of rotary selector switch 17.

In the position A of rotary selector switch 17, the chromatogram shows the composite of hydrogen, oxygen, nitrogen, carbon monoxide and methane, carbon dioxide, and light hydrocarbons. In the position C, the chromatogram shows hydrogen, oxygen, nitrogen, methane and carbon monoxide. If all the components are clearly separated from each other on the two chromatograms, the position B of rotary selector switch 17 can be used for this analysis and one chromatogram shows all the components of this mixture of gas.

When the gas to be analyzed consists of carbon dioxide and light hydrocarbon only, the sample is injected into the inlet system 28 and the position A of rotary selector switch 17 is used. And for the analysis of a mixture of hydrogen, oxygen, nitrogen, carbon monoxide and methane, the sample is injected into the sample inlet system 29 and the position C of rotary selector switch 17 is used.

By adding only the resistors in the Wheatstone bridge of thermal conductivity cell and one rotary selector switch between the Wheatstone bridge and the recording system, this apparatus for gas chromatography can be used as a double column apparatus and two different column gas chromatography instruments.

FIGURE 3 is an electrical diagram of a modification of the electric circuits of FIGURE 1.

The resistors 5, 6 and 7 have a constant value of resistance, but the electrical resistance of four elements 1, 2, 3 and 4 varies with their temperatures.

It is better to use the same elements instead of resistors 5 and 7 in FIGURE 1, since the chromatographic sensitivity of a substance is different at the position B and at the position A or C of the rotary selector switch.

The bridge of FIGURE 3 is same as that of FIGURE 1 except the two elements 36 and 38 are used instead of resistors 5 and 7.

FIGURES 4a–4c are three reproductions of chromatograms at three different positions A, B and C of the rotary selector switch.

Referring to FIGURE 5, the thermal conductivity cell 45 has six elements 1', 2', 3', 4', 36' and 38', two columns 52 and 53, two inlet systems 54 and 55, carrier gas inlet 56 and outlet 57.

In the embodiments described hereinbefore, two columns are used, but this invention is applicable to a larger number of columns.

FIGURE 6 shows an electrical diagram of a modification of the apparatus having three columns and FIGURE 7 shows a block diagram of this case.

FIGURE 6 is an electrical diagram showing a second modification of the electrical circuit described in FIGURE 1. There are six elements 1, 2, 3, 4, 60 and 63, four variable resistors 6, 10, 11 and 64 and four leads 72, 73, 74 and 75 from the four variable resistors are connected to the recording instrument through an electrical selector switch (not described in FIGURE 6).

FIGURE 7 is a diagram of the arrangement of elements and columns for the electrical circuit described in FIGURE 6. The thermal conducting cell 76 has six elements 1', 2', 3', 4', 60' and 62', three columns 83, 84 and 85 and three inlet systems 86, 87 and 88.

While we have described certain presently preferred embodiments of our invention, it is to be understood that they may be otherwise embodied within the scope of the appended claims.

We claim:
1. A gas chromatographic apparatus, comprising a thermal conductivity cell having a plurality of cell portions which is an even number of at least six, at least three of said cell portions being reference portions and the other three being sampling portions, at least two gas chromatographic columns, said columns and said cell portions being connected in a gas flow circuit comprised of the reference cell portions, and then alternate columns and sampling cell portions, said gas flow circuit having a gas inlet immediately preceding each column, a plurality of temperature responsive electrical resistance elements, one in each cell portion, the resistance elements in the reference cell portions being reference resistance elements and the resistance elements in the sampling cell portions being sampling resistance elements, a plurality of variable resistances each having a movable contact forming a part thereof, said plurality being at least half the number of cell portions, said resistance elements being connected in a plurality of parallel circuits each consisting of a reference resistance element, a sampling resistance element and a variable resistance connected between them, the opposite ends of said parallel circuits being connected to common points, a D.C. power source connected across said common points, a double pole multi-position switch having a plurality of contacts to which the movable contacts of the variable resistances are connected respectively for connecting said parallel circuits as parts of different bridge circuits when said switch is in different positions.

2. An apparatus as claimed in claim 1 in which there are six cell portions, six electrical resistance elements and three variable resistances, there being three parallel circuits, and said switch is a three position double pole switch, the switch in one position connecting the first and second of said parallel circuits in a bridge circuit and in the second position connecting the second and third of said parallel circuits in a bridge circuit, and in the third position connecting the first and third of said parallel circuits in a bridge circuit.

3. An apparatus as claimed in claim 1 in which there are six cell portions, six electrical resistance elements and four variable resistances, there being three parallel circuits, and said fourth variable resistance being connected in parallel with said three parallel circuits, and said switch is a four position double pole switch, the switch in one position connecting the first and second of said parallel circuits in a bridge circuit and in the second position connecting the second and third of said parallel circuits in a bridge circuit, and in the third position connecting the first and third of said parallel circuits in a bridge circuit, and in the fourth position connecting said fourth variable resistance in a bridge circuit with one of the other parallel circuits.

4. An apparatus as claimed in claim 1 having a further variable resistance with a movable contact which is connected in parallel with said parallel circuits, and said multiposition switch has a pole thereon to which the movable contact of the further variable resistance is connected.

5. A gas chromatographic apparatus, comprising a thermal conductivity cell having a plurality of cell portions which is an even number of at least four, at least two of said cell portions being reference portions and the other two being sampling portions, at least two gas chromatographic columns, said columns and said cell portions benig connected in a gas flow circuit comprised of the reference cell portions and then alternate columns and sampling cell portions, said gas flow circuit having a gas inlet immediately preceding each column, a plurality of temperature responsive electrical resistance elements, one in each cell portion, and at least two additional such elements, the resistance elements in the reference cell portions being reference resistance elements and the resistance elements in the sampling cell portions being sampling resistance elements, a plurality of variable resistances each having a movable contact forming a part thereof, said plurality being at least half the number of cell portions, said resistance elements being connected in a plurality of parallel circuits each consisting of a reference resistance element, a sampling resistance element and a variable resistance connected between them, and said two additional such elements being connected in an additional parallel circuit with a variable resistance connected between them, the opposite ends of said parallel circuits being connected to common points, a D.C. power source connected across said common points, a double pole multi-position switch having a plurality of contacts to which the movable contacts of the variable resistances are connected respectively for connecting said parallel circuits as parts of different bridge circuits when said switch is in different positions.

References Cited

UNITED STATES PATENTS

| | | | |
|---|---|---|---|
| 2,182,554 | 12/1939 | Galk | 73—342 |
| 2,416,276 | 2/1947 | Ruge | 73—342 X |
| 2,633,737 | 4/1953 | Richardson | 73—27 |
| 3,236,092 | 2/1966 | Carter | 73—23.1 |

OTHER REFERENCES

Hamilton: "Application of the Fisher Model 25 Gas Partitioner to Respiratory and Blood Gas Determinations," 1961, pp. 1–5 and Figures 1-A, 1-B and 3 relied on.

RICHARD C. QUEISSER, *Primary Examiner.*

C. A. RUEHL, *Assistant Examiner.*